UNITED STATES PATENT OFFICE 2,626,911

PROCESS FOR BREAKING PETROLEUM EMULSIONS

Melvin De Groote, University City, Mo., assignor to Petrolite Corporation, a corporation of Delaware No Drawing. Application May 14, 1951, Serial No. 226,328

8 Claims. (Cl. 252—340)

The present invention is a continuation-in-part of my co-pending applications, Serial No. 104,801 filed July 14, 1949 (now Patent 2,552,528, granted May 15, 1951), and Serial No. 159,863, filed May 3, 1950 (now Patent 2,602,064, granted July 1, 1952).

The first of the aforementioned co-pending applications describes the resolution of petroleum emulsions by the oxypropylated derivatives of certain polyhydric materials free from a radical having at least 8 uninterrupted carbon atoms. Additionally said aforementioned co-pending application points out that certain derivatives, for instance, the esters derived from polycarboxy acids, can be employed for the same purpose, i. e., process for breaking petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil, and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

The present invention relates to a process for breaking petroleum emulsions of the water-in-oil type characterized by subjecting the emulsion to the action of a demulsifier which includes an acidic fractional ester of oxypropylated hexanetriol-1,2,6. The oxypropylated hexanetriol-1,2,6 which is used to produce the esters is kerosene-soluble, is made from a triol free from any radical having at least 8 uninterrupted carbon atoms, and the amount of propylene oxide used in producing the triol is from 18 to 90 moles of propylene oxide per mole of triol, on an average statistical basis, the molecular weight of the oxypropylated triol being within the range of 1000 to 10,000. The polycarboxy acids used to form the esters are the conventional polycarboxy acids having 2 or 3 carboxy groups and advantageously having not more than 8 carbon atoms, the molar proportion of polycarboxy acid to oxypropylated triol being one mole of polycarboxy acid for each available hydroxl group.

Complementary to the above aspect of the invention herein disclosed is my companion invention concerned with the new chemical products or compounds used as the demulsifying agents in said aforementioned processes or procedures, as well as the applications of such chemical compounds, products, or the like, in various other arts and industries, along with the method for manufacturing said new chemical products or compounds which are of outstanding value in demulsification. See my co-pending application, Serial No. 226,329, filed May 14, 1951.

For convenience, what is said hereinafter will be divided into three parts:

Part 1 is concerned with the preparation of oxypropylated derivatives of hexanetriol-1,2,6;

Part 2 is concerned with the preparation of acidic fractional esters by reacting the polyhydroxylated compounds with polycarboxy acids; and Part 3 is concerned with the use of such acidic fractional esters as demulsifiers for resolving petroleum emulsions of the water-in-oil type.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C.

Under such circumstances the pressure will be less than 30 pounds per square inch unless some special procedure is employed as is sometimes the case, to wit, keeping an atmosphere of inert gas such as nitrogen in the vessel during the reaction. Such low-temperature-low reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure-low temperature low-reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant equipment which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves, are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds maximum, within a 5-pound variation one way or the other, but might drop to practically zero, especially where no solvent such as xylene is employed. The speed of reaction was comparatively slow under such conditions as compared with oxyalkylations at 200° C.

Numerous reactions were conducted in which the time varied for a complete oxypropylation, including several steps, from one day up to two days for the completion of the final member of the series. In some instances the reaction took place in considerably less time, for instance, 24 hours or less, as illustrated by subsequent examples. In the case of partial oxypropylation or step-wise oxypropylation I have found that the periods from 2 to 8 hours were convenient. In the following examples the time period varied from approximately 4 hours to 6 hours. The minimum time recorded, as a matter of fact, was 4 hours. Reactions indicated as being complete in 6 hours may have been complete in a lesser period of time in light of the automatic equipment employed. This applies also where reactions were conducted in a shorter period of time as, for example, in 4 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The reaction vessel employed was a stainless steel autoclave with the usual devices for heating, heat control, stirrer, inlet, outlet, etc., which are conventional in this type of apparatus. The capacity of the autoclave was approximately 5 liters. This was purely a matter of convenience in light of the size of the particular batch being processed. In other instances a 15-gallon autoclave was employed for comparably larger batches. The construction and operation of both size autoclaves were substantially the same. In both instances the stirrer operated at approximately 300 to 350 R. P. M. There were charged into the autoclave 260 grams of hexanetriol-1,2,6, along with 25 grams of sodium methylate. No solvent was employed. Sodium methylate was used although ground caustic soda or ground caustic potash is equally satisfactory.

The autoclave was sealed, swept with nitrogen gas, and stirring started immediately, and heat applied. The temperature was allowed to rise to slightly above the boiling point of water, to wit, about 115° C. At this point the addition of propylene oxide was started. It was added at such speed that it was absorbed by the reaction as rapidly as added. During this oxypropylation step, and in all succeeding oxypropylation steps, the temperature was held at 120°–125° C. In this particular step, and in all succeeding steps, the pressure was set for 35 to 40 pounds per square inch gauge. Actually, in practically every instance oxypropylation took place without the pressure getting beyond 30 pounds per square inch. The time required to add the oxide was 4 hours. It was added at a fairly constant rate, a total of 2400 grams being introduced. When the reaction was complete, part of the sample was withdrawn and the remainder subjected to further oxypropylation as described in Example 2a, immediately following.

*Example 2a*

1750 grams of the reaction mass previously identified as Example 1a, and equivalent to 169.5 grams of hexanetriol-1,2,6, 1564.2 grams of propylene oxide, and 16.3 grams of sodium methylate, were subjected to further oxypropylation under substantially the same conditions as described in Example 1a, preceding. 1160 grams of propylene oxide were added. The time required to add this oxide was 4½ hours. The oxide was added at a fairly constant rate. As previously stated, the conditions of oxypropylation were substantially the same as in Example 1a, preceding. When the reaction was complete, part of the reaction mass was withdrawn and subjected to further oxypropylation as described in Example 3a, immediately following.

*Example 3a*

2019 grams of the reaction mixture previously identified as Example 2a, preceding, and equivalent to 117.3 grams of the triol, 1890.4 grams of propylene oxide, and 11.3 grams of sodium methylate, were subjected to further oxypropylation in the manner employed in Examples 1a and 2a, preceding. The conditions of temperature and pressure were the same as in the previous examples. The amount of oxide added was 1035 grams, which was added in a 6-hour period, and at a fairly constant rate. When the oxypropylation was complete, part of the reaction mass was withdrawn and the remainder subjected to further oxypropylation as described in Example 4a, immediately following.

*Example 4a*

1568 grams of the reaction mass identified as Example 3a, preceding, and equivalent to 60.5 grams of the triol, 1501.7 grams of propylene oxide and 5.8 grams of sodium methylate, were subjected to further oxypropylation in the manner described in previous examples. The amount of oxide added was 706 grams. The time required for the addition was 6 hours. The oxide was added at a fairly constant rate.

What has been said preceding is presented in tabular form in Table 1, following, with some added information as to molecular weight and as to solubility of the reaction products in water, xylene, and kerosene.

TABLE 1

| Ex. No. | Composition Before | | | Theo. M. W. | Composition at End | | | | Max. Temp., °C. | Max. Pres., lbs. sq. in. | Time, hrs. |
|---|---|---|---|---|---|---|---|---|---|---|---|
| | H. C. Amt., lbs. | Oxide Amt., lbs. | Catalyst, lbs. | | H. C. Amt., lbs. | Oxide Amt., lbs. | Catalyst, lbs. | Hyd., Mol. Wt. | | | |
| 1a | 260.0 | | 25.0 | 1,370 | 260.0 | 2,400 | 25.0 | 1,194 | 120–125 | 35–40 | 4 |
| 2a | 169.5 | 1,564.2 | 16.3 | 2,290 | 169.5 | 2,724.2 | 16.3 | 1,725 | 120–125 | 35–40 | 4½ |
| 3a | 117.3 | 1,890.4 | 11.3 | 3,480 | 117.3 | 2,925.4 | 11.3 | 2,436 | 120–125 | 35–40 | 6 |
| 4a | 60.5 | 1,501.7 | 5.8 | 5,010 | 60.5 | 2,207.7 | 5.8 | 2,583 | 120–125 | 35–40 | 6 |

Example 1a was emulsifiable in water, soluble in xylene and insoluble in kerosene; Example 2a was emulsifiable in water, soluble in both xylene and kerosene; Example 3a was emulsifiable-to-insoluble in water, and soluble in both xylene and kerosene; and Example 4a was insoluble in water, and soluble in both xylene and kerosene.

The products obtained were usually viscous, somewhat syrupy liquids of amber, dark amber, or reddish color. The color may be due to a trace of iron because of contamination from the vessel employed. However, even when stainless steel is employed of such character that contamination by iron seems out of the question, there is still discoloration, probably due to the inherent nature of the initial raw material or a subsequent carmelization-like reaction. If it had been desirable, any suitable solvent might have been present during oxyalkylation, so long as it was inert to propylene oxide. Xylene is an example of such a solvent.

The derivatives so obtained can be decolorized in the usual manner by treating with charcoal, filtering clay, or the like. However, for the bulk of purposes for which such materials are used there is no necessity for decolorizing and in many instances, as in the present instance, the solvent may remain in the material.

It is obvious that certain modifications can be made which do not depart from the spirit of the invention. Modifications of hexanetriol-1,2,6 which bear a simple genetic relationship to that material and are water-soluble may be used as starting materials, provided the products obtained from them satisfy the specifications for such products, set out herein in detail. For example, the hexanetriol-1,2,6 could be treated with a mole of two or thereabouts of ethylene oxide or glycide, and the product employed as a starting material.

Similarly, after oxypropylation starts one could interrupt the procedure and introduce a mole or two of ethylene oxide, or glycide, and then resume oxypropylation. Either one of such minor modifications would not significantly, nor perhaps even detectibly, change the character of the initial raw material or the final oxypropylation derivative. Needless to say, such variation would not be departing the slightest from the spirit of the invention.

If one examines the preceding table, it will be seen that if one start with hexanetriol-1,2,6, of molecular weight 134, and adds successive amounts of propylene oxide, one obtains products having steadily declining proportions of this starting material, from about 10% down to less than 3%. As one approaches the maximum molecular weight of the presently included products, i. e., 10,000, the initial material may contribute little more than 1% to the final product. The maximum contribution, from the table, is somewhat less than 10% of the final oxypropylated triol.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out the present invention is concerned with acidic esters obtained from the oxypropylated derivatives described in Part 1, immediately preceding, and polycarboxy acids, particularly tricarboxy acids like citric, and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compound is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Groote & Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as paratoluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 and is then diluted further with sufficient solvent of a suitable nature, so that one has obtained a solution containing about 40%–45% oxypropylated triol. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures were conventional and have been so thoroughly described in the literature that further consideration will be limited to a few examples and a comprehensive table.

Other procedures for eliminating the residual basic catalyst, if any, may be employed. For example, if the oxyalkylation is conducted in absence of a solvent, as in the foregoing examples, or the solvent is removed after oxypropylation, the oxypropylation end-product can then be acidified with enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, straw-colored or amber liquid so obtained may contain a small amount of sodium sulfate or sodium chloride but, in any event, is perfectly acceptable for esterification in the manner described.

It is to be pointed out that the final products herein described are not polyesters in the sense that there is a plurality of both oxypropylated compound radicals and acid radicals. The product here is characterized by having only one oxypropylated compound radical.

By following slight modifications of what has been said previously one can conduct the esterification on a laboratory scale with greater convenience. Obviously, if one starts with a polyhydric compound having 3 hydroxyls and adds a polycarboxy acid there is at least some opportunity for cross-linking and formation of insoluble materials. However, insolubility or a gelation effect can arise in other ways, for instance, possible incipient cross-linking rather than intermediate or complete cross-linking, and also the fact that there are certain limitations as far as solubility goes in any large molecule, to say nothing of peculiarities of structure. After the water is removed in the case of the esterification by means of a water-insoluble solvent, such as benzene, xylene or the use of some other comparable solvent or mixtures, one is confronted with the fact that the acidic ester is not necessarily soluble in such nopolar solvent, and possibly because it either does cross-link or at least gives a pseudo gel. I have used the terminology "pseudo gel" for the reason that such gel is reversible as distinguished from a true non-reversible gel produced by cross-linking. The exact nature of this tendency to become insoluble or tendency toward gelation is obscure and not fully understood. In light of the effect of semi-polar solvents there may be some relationship, and in fact an important one to hydrogen bonding factors.

However, by selection of solvent, one tends to eliminate this effect. In the present examples, I have found it desirable to employ xylene as the solvent present during the esterification procedure. After completion of such esterification procedure and elimination of the water of reaction by distillation in the presence of such xylene solvent I usually prefer to add to the xylene solution of the finished ester product a minor proportion of methanol. The amount of methanol added is usually 5%, 6%, or 7% of the nonhydroxylated solvents previously present. In Table 3, column 2, below, the solvent is recited as "xylene-methanol." This reference is to products prepared as just stated, i. e., xylene is the solvent present during the esterification step and methanol is the solvent added subsequently in preparing the final solution of the esters. All solutions of the oxypropylated triol, as before stated, were about 40%–45% concentrated, i. e., contained 55%–60% of such solvent. Any other desirable concentrations might have been equally well employed. The finished esters of the examples in the tables below are in the form of approximately 50% solutions in the xylene-methanol solvent.

The data included in Tables 2 and 3 below, are self-explanatory and very complete. No further elaboration is necessary.

TABLE 2

| Ex. No. of Acid Ester | Ex. No of Oxy. Cmpd. | Theo. M. W. of H. C. | Theo. Hydroxyl V. of H. C. | Actual Hydrox. Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,370 | 123 | 141 | 1,194 | 95.5 | Diglycolic Acid | 32.2 |
| 2b | 1a | 1,370 | 123 | 141 | 1,194 | 95.5 | Oxalic Acid | 30.2 |
| 3b | 1a | 1,370 | 123 | 141 | 1,194 | 95.5 | Aconitic Acid | 41.8 |
| 4b | 1a | 1,370 | 123 | 141 | 1,194 | 95.5 | Adipic Acid | 35.0 |
| 5b | 1a | 1,370 | 123 | 141 | 1,194 | 95.5 | Phthalic Anhyd | 35.6 |
| 6b | 1a | 1,370 | 123 | 141 | 1,194 | 95.5 | Maleic Anhyd | 23.7 |
| 7b | 2a | 2,290 | 73.5 | 97.5 | 1,725 | 103.5 | Diglycolic Acid | 24.1 |
| 8b | 2a | 2,290 | 73.5 | 97.5 | 1,725 | 103.5 | Oxalic Acid | 22.7 |
| 9b | 2a | 2,290 | 73.5 | 97.5 | 1,725 | 103.5 | Aconitic Acid | 31.3 |
| 10b | 2a | 2,290 | 73.5 | 97.5 | 1,725 | 103.5 | Adipic Acid | 26.3 |
| 11b | 2a | 2,290 | 73.5 | 97.5 | 1,725 | 103.5 | Phthalic Anhyd | 26.6 |
| 12b | 2a | 2,290 | 73.5 | 97.5 | 1,725 | 103.5 | Maleic Anhyd | 17.7 |
| 13b | 3a | 3,480 | 48.4 | 69.0 | 2,436 | 97.5 | Diglycolic Acid | 16.1 |
| 14b | 3a | 3,480 | 48.4 | 69.0 | 2,436 | 97.5 | Oxalic Acid | 15.1 |
| 15b | 3a | 3,480 | 48.4 | 69.0 | 2,436 | 97.5 | Aconitic Acid | 20.9 |
| 16b | 3a | 3,480 | 48.4 | 69.0 | 2,436 | 97.5 | Adipic Acid | 17.5 |
| 17b | 3a | 3,480 | 48.4 | 69.0 | 2,436 | 97.5 | Phthalic Anhyd | 17.6 |
| 18b | 3a | 3,480 | 48.4 | 69.0 | 2,436 | 97.5 | Maleic Anhyd | 10.2 |
| 19b | 4a | 5,010 | 33.6 | 65.0 | 2,583 | 129.2 | Diglycolic Acid | 20.1 |
| 20b | 4a | 5,010 | 33.6 | 65.0 | 2,583 | 129.2 | Oxalic Acid | 18.9 |
| 21b | 4a | 5,010 | 33.6 | 65.0 | 2,583 | 129.2 | Aconitic Acid | 26.1 |
| 22b | 4a | 5,010 | 33.6 | 65.0 | 2,583 | 129.2 | Adipic Acid | 21.9 |
| 23b | 4a | 5,010 | 33.6 | 65.0 | 2,583 | 129.2 | Phthalic Anhyd | 22.2 |
| 24b | 4a | 5,010 | 33.6 | 65.0 | 2,583 | 129.2 | Maleic Anhyd | 14.7 |

TABLE 3

| Ex. No. of Acid Ester | Solvent | Amt. Solvent (grs.) | Esterification Temp., °C. | Time of Esterification (hrs.) | Water Out (cc.) |
|---|---|---|---|---|---|
| 1b | Xylene-methanol | 123.3 | 149 | 3 | 4.4 |
| 2b | do | 110.9 | 150 | 3 | 14.8 |
| 3b | do | 132.9 | 152 | 3 | 4.4 |
| 4b | do | 126.5 | 176 | 7¾ | 4.0 |
| 5b | do | 131.1 | 154 | 6½ | |
| 6b | do | 119.2 | 150 | 5½ | |
| 7b | do | 124.4 | 155 | 5½ | 3.2 |
| 8b | do | 116.2 | 145 | 1¼ | 10 |
| 9b | do | 131.6 | 158 | 3¼ | 3.2 |
| 10b | do | 126.8 | 210 | 8¾ | 3.0 |
| 11b | do | 130.1 | 160 | 4¾ | |
| 12b | do | 121.2 | 150 | 4¾ | |
| 13b | do | 111.4 | 160 | 3½ | 2.2 |
| 14b | do | 105.0 | 162 | 3½ | 7.6 |
| 15b | do | 116.1 | 159 | 3½ | 2.3 |
| 16b | do | 112.9 | 174 | 5½ | 2.1 |
| 17b | do | 115.1 | 160 | 5½ | |
| 18b | do | 107.7 | 154 | 5¼ | |
| 19b | do | 146.0 | 160 | 4½ | 2.7 |
| 20b | do | 139.3 | 154 | 2¼ | 8.8 |
| 21b | do | 152.0 | 160 | 2¼ | 2.7 |
| 22b | do | 148.4 | 200 | 10 | 2.6 |
| 23b | do | 151.4 | 162 | 8½ | |
| 24b | do | 143.9 | 148 | 5 | |

The procedure for manufacturing the esters has been illustrated by the preceding examples. If for any reason reaction does not take place in an acceptable manner, attention should be directed to the following details: (a) Recheck the hydroxyl or acetyl value of the oxypropylated triol and use a stoichiometrically equivalent amount of acid; (b) if the reaction does not proceed with reasonable speed, either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation, particularly vacuum distillation. The esters prepared as described above vary in color from yellow through amber, dark amber, to reddish-brown. Their viscosity varies somewhat but all of them may be termed rather syrupy viscous liquids. They show moderate viscosity, or sometimes increased viscosity in light of what has been said previously in regard to cross-linking, gelation, etc. Unless there is some reason to do otherwise, my preference is to handle these esters as 50% solutions in suitable solvents. They can be bleached with bleaching clays, filtering chars, and the like. However, for the purpose of demulsification or the like, color is not a factor and decolorization is not justified.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of cacareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to pemit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipe-line or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 13b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 13b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to secure by Letters Patent, is

1. A process for breaking petroleum emulsions of the water-in-oil type characterized by subjecting the emulsion to the action of a demulsifier including a monomeric acidic fractional ester of the following structure:

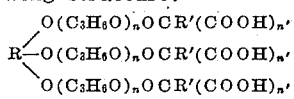

in which R is the radical of hexanetriol-1,2,6, and R' is the polycarboxy acid radical of the conventional polycarboxy acid

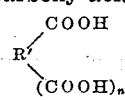

in which $n'$ represents the whole numbers 1 to 2, and $n$ represents a whole number varying from 6 to 30; with the proviso that $n$ be the statistical average based on the amount of propylene oxide reacted with the initial triol R(OH)$_3$; said triol being free from any radical having at least 8 uninterrupted carbon atoms; and with the further proviso that the oxypropylated triols

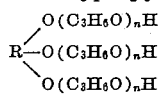

be kerosene-soluble, and that the statistical average molecular weight of said oxypropylated triols be within the range of 1,000 to 10,000.

2. A process for breaking petroleum emulsions of the water-in-oil type characterized by subjecting the emulsion to the action of a demulsifier including a monomeric acidic fractional ester of the following structure:

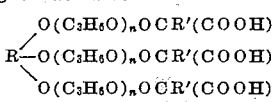

in which R is the radical of hexanetriol-1,2,6, and R' is the dicarboxy acid radical of the conventional dicarboxy acid

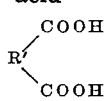

and $n$ represents a whole number varying from 6 to 30; with the proviso that $n$ be the statistical average based on the amount of propylene oxide reacted with the initial triol R(OH)$_3$; said triol being free from any radical having at least 8 uninterrupted carbon atoms; and with the further proviso that the oxypropylated triols

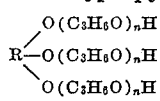

be kerosene-soluble, and that the statistical average molecular weight of said oxypropylated triols be within the range of 1,000 to 10,000, and that the preceding provisos are based on complete reaction involving the propylene oxide and the hexanetriol-1,2,6, and with the proviso that there be one mole of the dicarboxy acid for each available hydroxyl radical.

3. A process for breaking petroleum emulsions of the water-in-oil type characterized by subjecting the emulsion to the action of a demulsifier including a monomeric acidic fractional ester of the following structure:

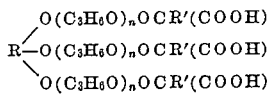

in which R is the radical of hexanetriol-1,2,6, and R' is the dicarboxy acid radical of the conventional dicarboxy acid

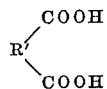

and $n$ represents a whole number varying from 6 to 30; with the proviso that $n$ be the statistical average based on the amount of propylene oxide reacted with the initial triol $R(OH)_3$; said triol being free from any radical having at least 8 uninterrupted carbon atoms; and with the further proviso that the oxypropylated triols

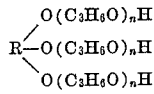

be kerosene-soluble, and that the statistical average molecular weight of said oxypropylated triols be within the range of 1,000 to 10,000, and that the preceding provisos are based on complete reaction involving the propylene oxide and the hexanetriol-1,2,6, and with the proviso that there be one mole of the dicarboxy acid for each available hydroxyl radical, and that the dicarboxy acid have not more than 8 carbon atoms.

4. The process of claim 3 wherein the dicarboxy acid is phthalic acid.

5. The process of claim 3 wherein the dicarboxy acid is maleic acid.

6. The process of claim 3 wherein the dicarboxy acid is succinic acid.

7. The process of claim 3 wherein the dicarboxy acid is citraconic acid.

8. The process of claim 3 wherein the dicarboxy acid is diglycolic acid.

his
MELVIN × DE GROOTE.
mark

Witnesses to mark:
W. C. ADAMS,
I. S. DE GROOTE.

REFERENCES CITED

The following references are of record in the file of this patent:

UNITED STATES PATENTS

| Number | Name | Date |
|---|---|---|
| 2,344,980 | De Groote et al. | Mar. 28, 1944 |
| 2,454,808 | Kirkpatrick et al. | Nov. 30, 1948 |
| 2,552,528 | De Groote | May 15, 1951 |
| 2,552,529 | De Groote | May 15, 1951 |
| 2,552,532 | De Groote | May 15, 1951 |
| 2,552,533 | De Groote | May 15, 1951 |
| 2,554,667 | De Groote | May 29, 1951 |
| 2,562,878 | Blair | Aug. 7, 1951 |